Figure 1:
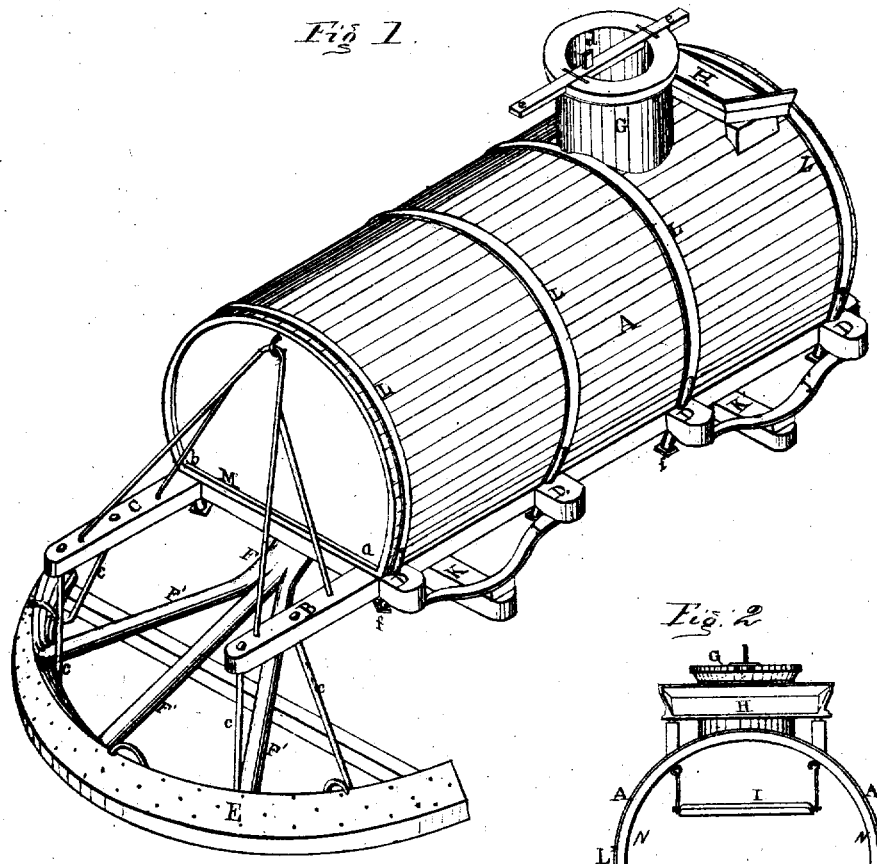

L. F. BANCROFT.

Street-Sprinklers.

No. 5,325. Reissued March 18, 1873.

Witnesses

Thos. H. Dodge

H. L. Fuller.

Inventor

L. F. Bancroft

AM. PHOTO-LITHOGRAPHIC CO. N.Y. (OSBORNE'S PROCESS.)

UNITED STATES PATENT OFFICE.

LOREY F. BANCROFT, OF WORCESTER, MASSACHUSETTS, ASSIGNOR, BY MESNE ASSIGNMENTS, TO EDWARD E. QUIMBY, TRUSTEE, OF NEW YORK CITY.

IMPROVEMENT IN STREET-SPRINKLERS.

Specification forming part of Letters Patent No. 53,557, dated April 3, 1866; reissue No. 3,917, dated April 12, 1870; reissue No. 5,325, dated March 18, 1873.

*To all whom it may concern:*

Be it known that I, LOREY F. BANCROFT, of Worcester, Massachusetts, have invented certain Improvements in Street-Sprinklers, of which the following is a specification:

My invention relates to the construction of the water-tanks of street-sprinkling machines, and embraces, first, adjustable clamping-bands for closing the joints of the tank to prevent leakage; and, secondly, a peculiarly-shaped tank, which combines the advantages of the cylindrical tank and the box tank. The advantages of the cylindrical tank are, first, that it can be made of planks or staves, hooped or banded together, which is the strongest mode of construction; and, secondly, that it has no perpendicular sides, which are objectionable because they present considerable areas of direct resistance to the lateral sway of the contained water. The advantages of the box tank are, first, that by reason of its flat bottom it obtains a broad bearing and firm support upon the running-gear; and, secondly, that its contents are not elevated above the running-gear so much as the contents of a cylindrical tank must be. The nearer the tank is to the ground, the shorter will be the radius of its lateral motion as the machine passes over rough pavements or inequalities of surface, and the less will be the strain to which the whole contrivance is subjected. My tank approximates to the cylindrical form sufficiently to allow of its being made of planks or staves held together by my adjustable clamping-bands, while it has a flat bottom, M, which is slightly less in width than the extreme lateral diameter of the tank, as shown in the drawing.

It will be seen that a tank of this form, while it is substantially cylindrical, is yet capable of receiving firm support, and of being thoroughly incorporated into the structure of the vehicle upon which it is mounted.

Figure 2:
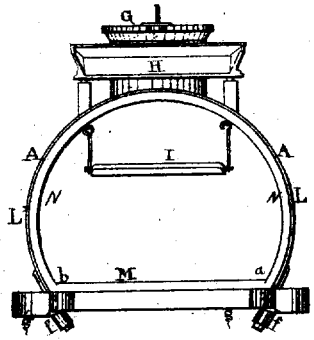

Figure 1 represents a perspective view of my improved street-sprinkler, and Fig. 2 represents a front view.

Like letters of reference designate the same parts in both figures.

The tank A rests upon a frame composed of the longitudinal timbers B and C and cross-timbers D D D D. E is the sprinkling-chamber, which is supported by stay-rods *c c c c*, from the projecting ends of the timbers B and C. The water passes to the sprinkling-chamber through the branch pipes F′ F′ F′ of pipe F. G is the turret or dome, through which water may be introduced to the tank A, and which also serves to contain the valve-rod *d*, operated by the slide *e*, by means of which water is let on or shut off from the sprinkling apparatus. This dome, turret, or combing, as it may be called, may be of any convenient shape, with its vertical sides sufficiently elevated above the tank to prevent the water inside from splashing out by the motion of the carriage. The cross-timbers extend by or project at each side, so that springs J J can be applied to support the water-receptacle A outside of the latter, as fully indicated in the drawing, thus enabling the same to be supported in a secure and easy manner. The springs J and J′, on either side of the tank A, rest, respectively, upon the rocker-timbers or bed-pieces K and K′, which are secured to the axles or running part of the truck. L L are the adjustable clamping-bands which embrace the tank A, and pass through the ends of the cross-pieces D to engage the washers *g* and nuts *f*, the ends of the bands having the male thread of a screw cut upon them.

If the tank leaks through the joints, the planks or staves can all be compressed together so as to close all the joints by tightening the nuts *f f*, &c., and the leakage can thus be effectually stopped.

I claim as my invention—

1. In combination with the tank provided with apparatus for discharging jets of water, the adjustable clamping-bands L L, and the carriage or truck upon which the tank is mounted, substantially as described.

2. A carriage or truck and suitable sprinkling apparatus, in combination with a tank having a flat bottom narrower than the extreme lateral diameter of the tank, substantially as described, and for the purpose set forth.

3. The turret G upon the tank, as arranged with relation to the valve and to the sprinkling apparatus, substantially as described, and for the purposes set forth.

LOREY F. BANCROFT.

Witnesses:

GEORGE SWAN,

HENRY L. PARKER.